United States Patent [19]
Siglock et al.

[11] Patent Number: 5,289,148
[45] Date of Patent: Feb. 22, 1994

[54] ADAPTABLE POWER SWITCH MODULE FOR CIRCUIT BREAKER PANELS

[75] Inventors: John V. Siglock, Sierra Madre, Calif.; Lawrence Phillips, Jr., Kula, Hi.

[73] Assignee: Intelligent Electrical Products, Inc., Anaheim, Calif.

[21] Appl. No.: 984,462

[22] Filed: Dec. 2, 1992

[51] Int. Cl.[5] .............................................. H01H 9/02
[52] U.S. Cl. ...................................... 335/202; 335/14; 335/20
[58] Field of Search ..................... 335/202, 131–132, 335/8–10, 14, 16, 20

[56] References Cited

U.S. PATENT DOCUMENTS

| | | | |
|---|---|---|---|
| 3,753,173 | 8/1973 | Goldberg | 335/1 |
| 4,194,182 | 3/1980 | Martin | 340/310 |
| 4,272,687 | 6/1981 | Borkan | 307/115 |
| 4,532,486 | 7/1985 | Terrier | 335/13 |
| 4,714,976 | 12/1987 | Pin et al. | 361/114 |
| 4,754,162 | 6/1988 | Kondou et al. | 307/112 |
| 4,879,535 | 11/1989 | Mori et al. | 335/6 |
| 4,926,282 | 5/1990 | McGhie | 361/102 |
| 4,965,694 | 10/1990 | Dvorak et al. | 361/64 |
| 5,003,139 | 3/1991 | Edds et al. | 200/401 |

Primary Examiner—Lincoln Donovan
Attorney, Agent, or Firm—Christie, Parker & Hale

[57] ABSTRACT

A power switching module is adaptable for installation in a variety of existing circuit breaker panels. The module contains electrical controls providing selected control functions, such as an integral timer function. The module plugs into an existing breaker position in the circuit breaker panel adjacent a conventional circuit breaker on the same panel. The module has external terminals, including an interchangeable clip for connecting to the circuit breaker panel buss, a switched-circuit input series-connected to the load line output from the adjacent circuit breaker, a switched circuit output for carrying power to an external load being controlled by the switch, and a neutral wire extending to a neutral terminal on the panel. A microprocessor contained in the module provides the switched timer function that is set by digital inputs and displayed on the module housing. The microprocessor obtains operating power from the circuit breaker panel buss and controls operation of the switch solenoids. The power switching module obtains power for the switched load and over-current protection from the series-connected circuit breaker.

15 Claims, 10 Drawing Sheets

ADAPTABLE POWER SWITCH MODULE FOR CIRCUIT BREAKER PANELS

FIELD OF THE INVENTION

This invention relates to electrical power switching controls, and more particularly, to an adaptable power switching module that can be easily installed in a variety of existing circuit breaker panels.

BACKGROUND OF THE INVENTION

Due to concerns for energy conservation, three has been a recognized need for control devices for automatically switching electric power. Electronic timers for automatically controlling the on and off cycles of appliances or outdoor lights are an example. In order to reduce wiring and installation costs, power switching controllers have been adapted for installation in a standard circuit breaker panel. U.S. Pat. No. 4,272,687 to Borkan discloses a single-pole device for this purpose, and U.S. Pat. No. 4,754,162 to Kundou, et al. discloses a multi-pole device. A disadvantage of these devices is that both include a power switching controller and circuit breaker integrated within a circuit breaker housing that attaches to the breaker panel. As a result, each device must be produced in all the standard ampere ratings desired, in order to be used in a specific application. Further, they must be produced in various housings and configurations required by the available circuit breaker panels. Both of these objections result in higher production costs and subsequent lower utilization.

SUMMARY OF THE INVENTION

Briefly, the present invention provides a power switching module adaptable for installation in a variety of existing circuit breaker panels. The module contains electrical controls providing an integral timer function, a relay function, or other electrical control functions The module plugs into an existing space in the circuit breaker panel, adjacent to a conventional circuit breaker occupying an adjacent or near-by space in the same panel. The module has external terminals including a power buss attachment clip for connecting to the circuit breaker panel buss, a switched circuit input series-connected to the load output from the adjacent circuit breaker, a switched-circuit output for carrying power to an external load controlled by the switch, and a neutral wire extending to a neutral terminal on the panel. A microprocessor contained in the module provides the switched control function, such as a timer that is set by digital microprocessor push-button inputs on the exterior of the module housing. Timer functions are displayed on an LCD also on the housing. A switch-activator opens and closes the contacts of a spring-biased switching arm. The switch-activator, in one embodiment, is a single-armature, double-solenoid device that receives switching control signals from the microprocessor. The microprocessor controller obtains its operating power from the circuit breaker panel buss and controls operation of the switch solenoids. The power switching module also obtains power for the switched load and over-current protection from the series-connected circuit breaker, via a circuit passing from the circuit beaker panel buss, through the adjacent circuit breaker to the switched circuit input, through the closed contacts of the switch, and then through the switched circuit output to the external load.

The series-connected circuit breaker is contained in a separate unit apart from the switch control module housing. This permits use of interchangeable power buss attachment clips on the switch module, so that the module can be connected to the standard breaker position in any type of circuit breaker panel, irrespective of the panel's ampere rating, voltage rating, or type of power buss connector. The switch may be used irrespective of the current rating of the circuit breaker panel. Each circuit breaker installed in the panel generates a watt loss depending upon its current rating. The switch contacts dissipate substantially less power as heat than the watt loss of any circuit breaker in the panel. Circuit breakers must be manufactured in the variety of ampere ratings to protect the wiring in all devices on the load side of the circuit breaker. The separate circuit breaker, to which the switch module is series-connected, provides the necessary overload protection.

The interchangeable buss attachment clips overcome the problem created by the variety of mounting and attachment styles among the different manufacturers of breaker panels. Additionally, the outer dimensions of the switch module are configured to match the dimensions of those manufacturers' circuit breakers. It is possible to easily interchange the buss attachments without presenting a safety hazard because the controls within the switch module only obtain the relatively small currents necessary for their operation, and not the load current from the circuit breaker panel buss. The power for the load is obtained from the existing series-connected circuit breaker in the panel through a standard-style wiring terminal. This arrangement additionally provides a greater safety margin since manufacturers occasionally make changes to their panels and cannot possibly account for devices of other manufacturers which may be installed in their panels. The current required and the power dissipated by the power switch module is orders of magnitude below that which is ordinarily provided at a breaker position in the panel.

The switching module can be adapted to a variety of control functions in which the microprocessor contained in the module provides the particular selected function These include functioning as a timer, a relay, a means to transmit data or receive commands, or other control means, the purpose being to provide a readily usable means to switch power to loads originating from the circuit breaker panel while utilizing the existing means of over-current protection.

In a further embodiment of the invention, the switch is controlled by use of extremely small solenoids when compared with the force required to hold the contacts together during switching. The solenoid controller is overdriven for a small time interval, with the microprocessor controlling the on-time and the repetition rate to prevent their overheating. The conductive switching arm includes a shunt braid arrangement for reducing current and heat overload within the switch arm itself. The double-solenoid switch controller includes a common armature, and this arrangement conserves space and thereby allows the module to easily fit within the existing breaker position in a conventional breaker panel.

As one example of the advantage of this invention, in which a timer is installed to control outdoor lights, the conventional approach is to run wire between the timer and the load, and for an electrician to install the timer and run conduit between the circuit breaker and the load. Power is cut off and the connections are made. With the timer module of the present invention, the switch module is connected to an empty space in the circuit breaker panel, and the circuit breaker connected to the load is instead connected to the switch module. The switch module ground wire is connected to the ground terminal in the breaker panel. No remote connections are made and stringing of conduit to the circuit breaker is avoided.

These and other aspects of the invention will be more fully understood by referring to the following detailed description and the accompanying drawings.

DETAILED DESCRIPTION

Figure 1:
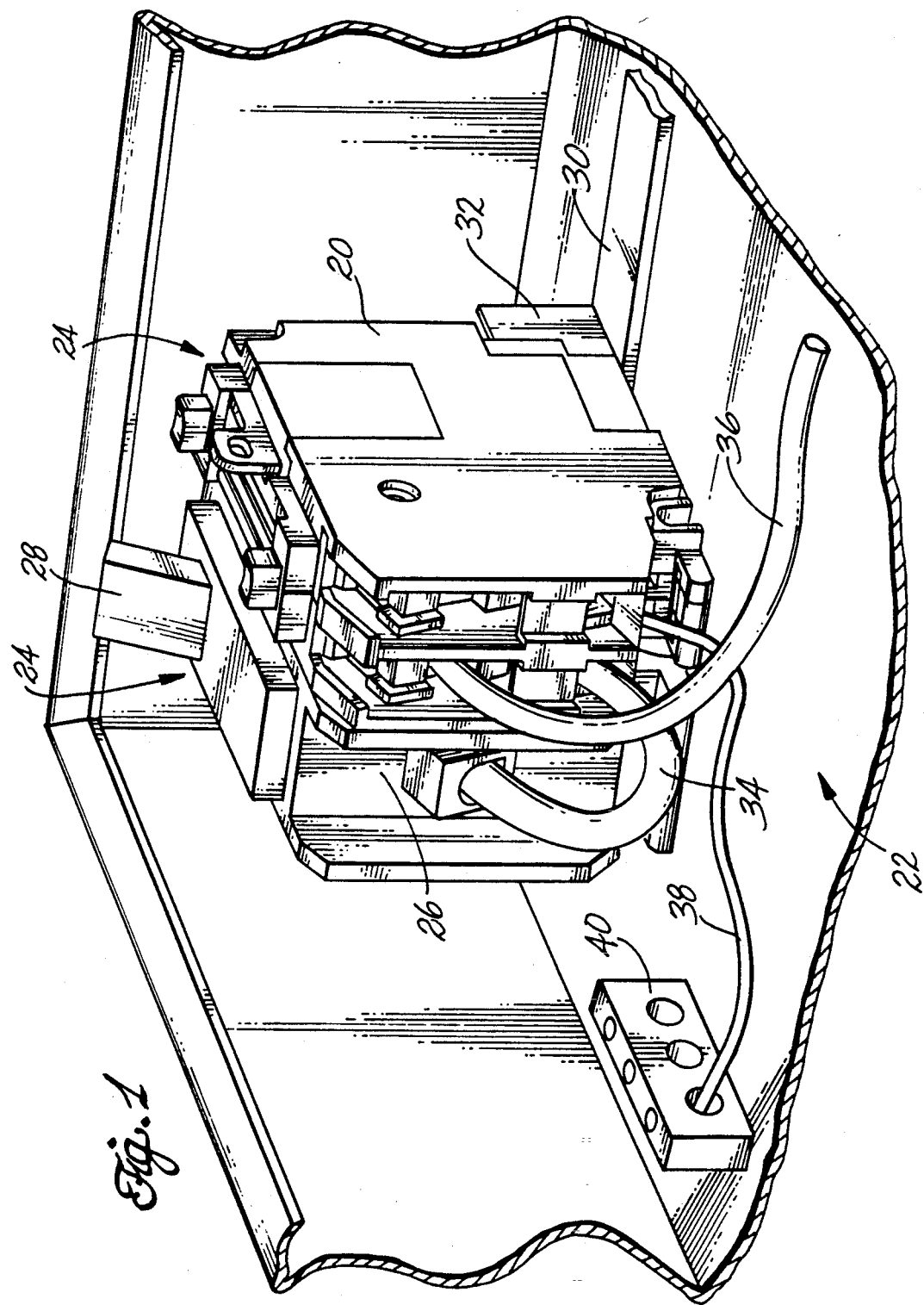
FIG. 1 is a fragmentary perspective view illustrating a conventional circuit breaker panel containing an adaptable power switching module, according to principles of this invention, series-connected to a conventional circuit breaker.

FIG. 1 illustrates an adaptable switching module 20 of this invention installed in a conventional circuit breaker panel 22. The panel has a series of side-by-side breaker positions 24, each of which has a predetermined size for receiving a separate circuit breaker housing of known dimensions and configuration. In the illustrated embodiment, one of these breaker positions is occupied by a conventional circuit breaker 26 having the well-known circuit breaker operator 28. The switching module 20 of this invention is shown installed in the space adjacent the standard circuit breaker 26. The circuit breaker panel also includes a circuit breaker power buss 30 in the form of an elongated conductive strip forming a common power buss for the standard circuit breaker units that are normally mounted side-by-side in the panel.

The switching module 20 includes an interchangeable buss clip 32 releasably connected to the buss 30 for providing electrical power to the circuitry contained internally within the module 20. An output line 34 on the load side of the circuit breaker 26 is series-connected to an input terminal of the switching module 20. A power outlet line 36 from one of the poles of the switching module 20 supplies power to an external load controlled by the switching module. A neutral wire 38 extends from a common ground connection on the switching module housing to a neutral terminal block 40 contained in the circuit breaker panel.

Figure 2:
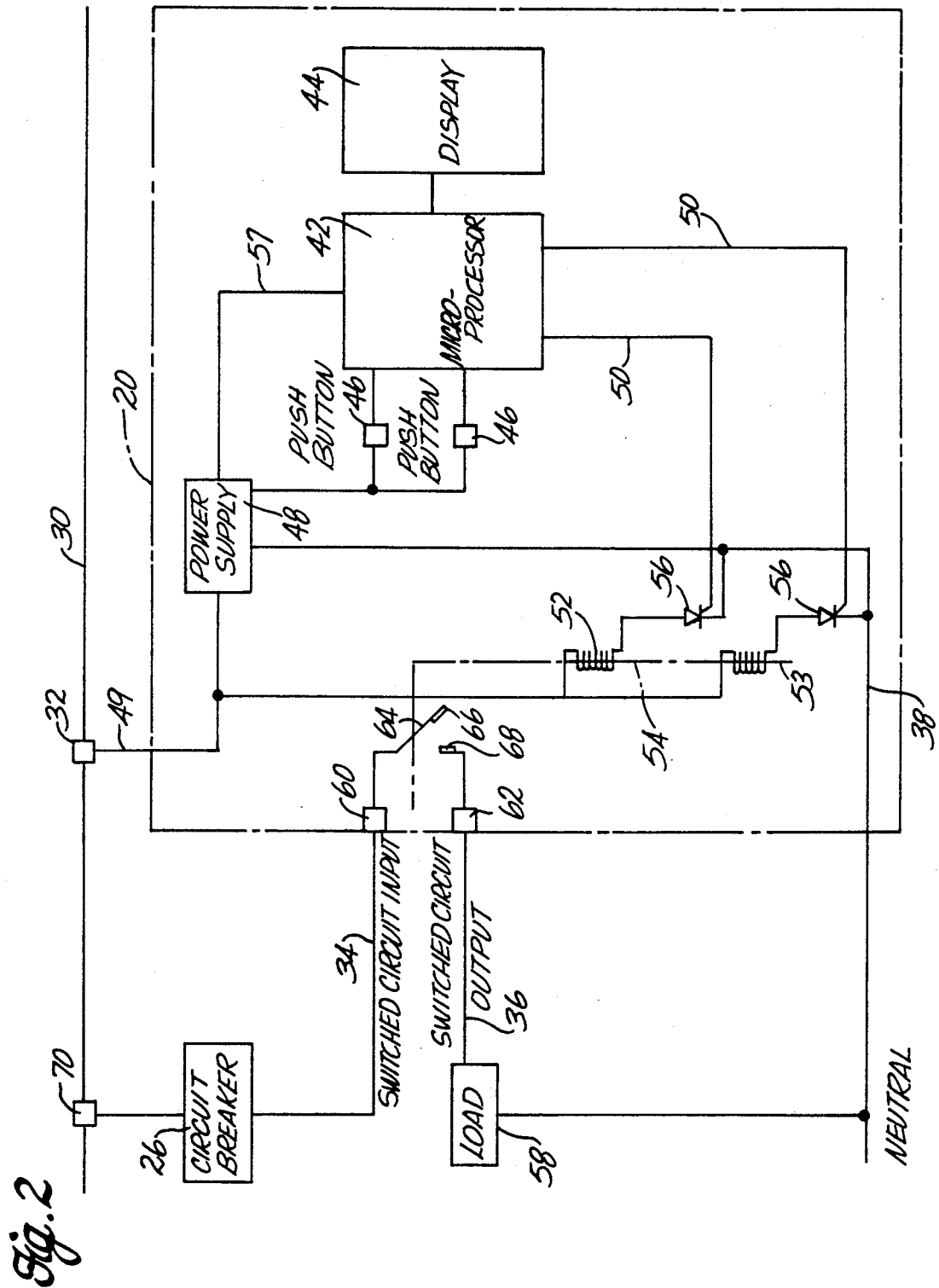
FIG. 2 is a functional block diagram schematically showing the functioning of the power switching module when series-connected to a circuit breaker in a circuit breaker panel and adapted for switching power to an external load.

The functional block diagram of FIG. 2 illustrates components of the adaptable power switching module 20 and the series connection of the switching module 20 to the circuit breaker 26. The switching module includes a microprocessor 42 that controls the switching function. In addition, the microprocessor controls a liquid crystal display (LCD) 44 for displaying selected control information in response to push-button inputs 46 to the microprocessor. An internal power supply 48 receives power from the buss 30 through the attachment of the buss clip 32 to the power buss. A line input 49 from the buss 30 supplies power to the power supply. The power supplied to the microprocessor is at current levels greatly below the rated current level for any circuit breaker in the circuit breaker panel. Output lines 50 from the microprocessor supply switch control signals to a pair of solenoids 52 and 53 coupled to a common armature (represented schematically at 54 in FIG. 2). In the embodiment in which the microprocessor 50 provides a timer function, output signals 50 from the timer drive the gates of SCRs 56 that power the switch control solenoids 52 and 53. The relative timing of the SCR gate drives is determined by the processor in response to a line input signal 57 from the power supply to the processor. The processor establishes a maximum signal repetition rate for the solenoids to prevent overheating them. As mentioned previously, the line input signal 57 to the processor is controlled by the power supply to a power level greatly below the rated power level of the breaker panel.

The module 20 is used to control switching of power to an external load 58. In one embodiment, in which the switching module 50 is a timer, the load can be electrical lights or an electrical appliance which are turned off or on at selected time intervals controlled by the timer. The push button inputs 46 are used for setting on and off cycling of the timer. The switching module 20 further includes a pair of switch input and output lugs 60 and 62, respectively. A movable switch arm 64 is connected across the lugs. Contacts 66 and 68 on the switch are shown in a normally open position in FIG. 2. The load 58 obtains electrical power on the switched circuit output line 36 which is coupled to the output lug 62 of the switch module. The output lug 62 is positioned in the module housing to make externally available a means of easily connecting the lug output line 36 to the load. The input lug 60 of the switch module receives power from the adjacent series-connected circuit breaker 26 through the switched circuit input line 34. The input lug 60 is positioned in the module housing to make externally available a means of easily connecting the circuit breaker line 34 to the lug 60. The adjacent circuit breaker 26 is connected to the buss 30 by a standard circuit breaker buss clip 70. Thus, the controls within the power switching module obtain operating power from the circuit breaker panel buss at very low power levels, well within the power rating of the circuit breaker panel; but the power switching module also obtains power for the switched load and over-current protection from the existing series-connected circuit breaker in the circuit breaker panel.

Figure 3:
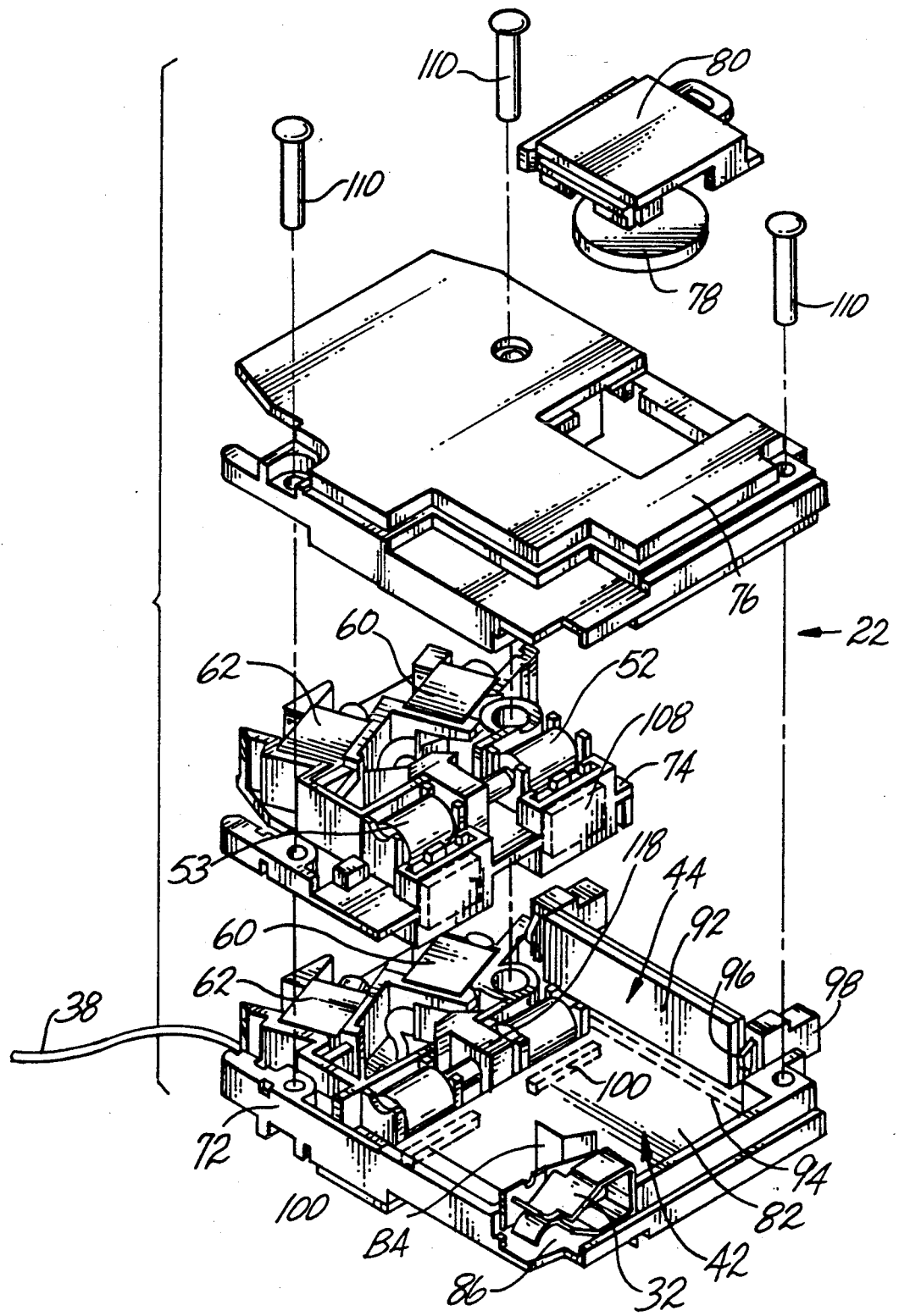
FIG. 3 is an exploded perspective view showing a two-pole adaptable power switch module configured to include an integral programmable timer function and showing one pole open and the other pole in the closed position.

FIGS. 3-6 illustrate the assembly of components used in the switch module 22. In the following description, the module will be described in relation to its use as a timer for controlling switching of an external load; however, other control functions provided by the processor electronics can be used without departing from the scope of the invention. In FIG. 3, the timer module is shown as a two-pole adaptable switch module configured as an integral programmable timer. Each pole of the switch is configured identically, with input and output wiring made at the lugs 60 and 62. A case half 72 mounts one pole of the switch, and a spacer 74 mounts the second pole. A cover 76 encloses the module and also provides for an optional replaceable battery 78 retained by a battery cover 80. The microprocessor 42 comprises a printed circuit board 82 mounted inside the module adjacent the first pole of the switch. The printed circuit board 82 carries control electronics for controlling operation of either pole of the switch. Not shown for clarity are the electrical components on the printed circuit board. In the preferred embodiment, they are of the surface-mount type and are located on both the top and bottom of the board.

The circuit board 82 makes a connection to the interchangeable buss attachment clip 32 through a power tab 84 carried on the board and held in contact with the clip. The switch module is adaptable to a variety of circuit breaker panels by use of the interchangeable buss clip 32, which can be removed and replaced with different styles of buss attachments to match the particular configuration of the circuit breaker panel buss 30. Thus, the buss attachment 32 may take many forms to facilitate its connection to various manufacturers' circuit breaker panels. Since power is not supplied to the load through the buss attachment, and since only a small current is obtained from the circuit breaker panel buss 30 for operating the switching module 20, it is possible to use an easily deformable clip of lighter gauge metal. The clip is inserted into a cavity 86 formed by the housing case 72 and the cover 76. The power tab 84 projects into this cavity and makes contact with the buss attachment 32, which is constructed so as to deflect upon insertion into the cavity; upon full insertion, it self-locks in place by means of tabs 88 and 90 (see FIG. 4) contained in the case 72 adjacent the cavity 86.

The display device 44, preferably in the form of a liquid crystal display module 92, is connected to the printed circuit board. In the illustrated embodiment, an elongated conductive elastomeric connector 94 is mounted in a narrow elongated slot 95 to connect the display unit to the printed circuit board. Push-button spring contacts 96 carried on push buttons 98 are connected to the printed circuit board through the elastomeric connector. The push-button spring contacts provide both a mechanical return for the push buttons as well as the electrical connections for the push-button functions.

The solenoids 52 and 53 are mounted on the base of the case 72 adjacent to the circuit board 82. Electrical connections to the solenoids for the bottom pole of the switch module are made to the circuit board through connectors 100 (shown in FIG. 3) which, in the preferred embodiment, are a multiplicity of fine wires supported by a compliant silicone rubber core. As shown best in FIG. 4, the solenoids are held in place on the case by tabs 102 engaged with projections 104 from the base of the case. The connectors 100 are contained in molded channels on the base. The connections for the solenoids on the upper pole are provided through interconnections 108 in the spacer 74.

The neutral wire 38 is attached to the printed circuit board 82 by routing through portions of the case 72 which provide a strain relief function.

Fasteners 110 accommodated by aligned holes in the case 72, the spacer 74, and the cover 76 secure all components in position.

Figure 4:
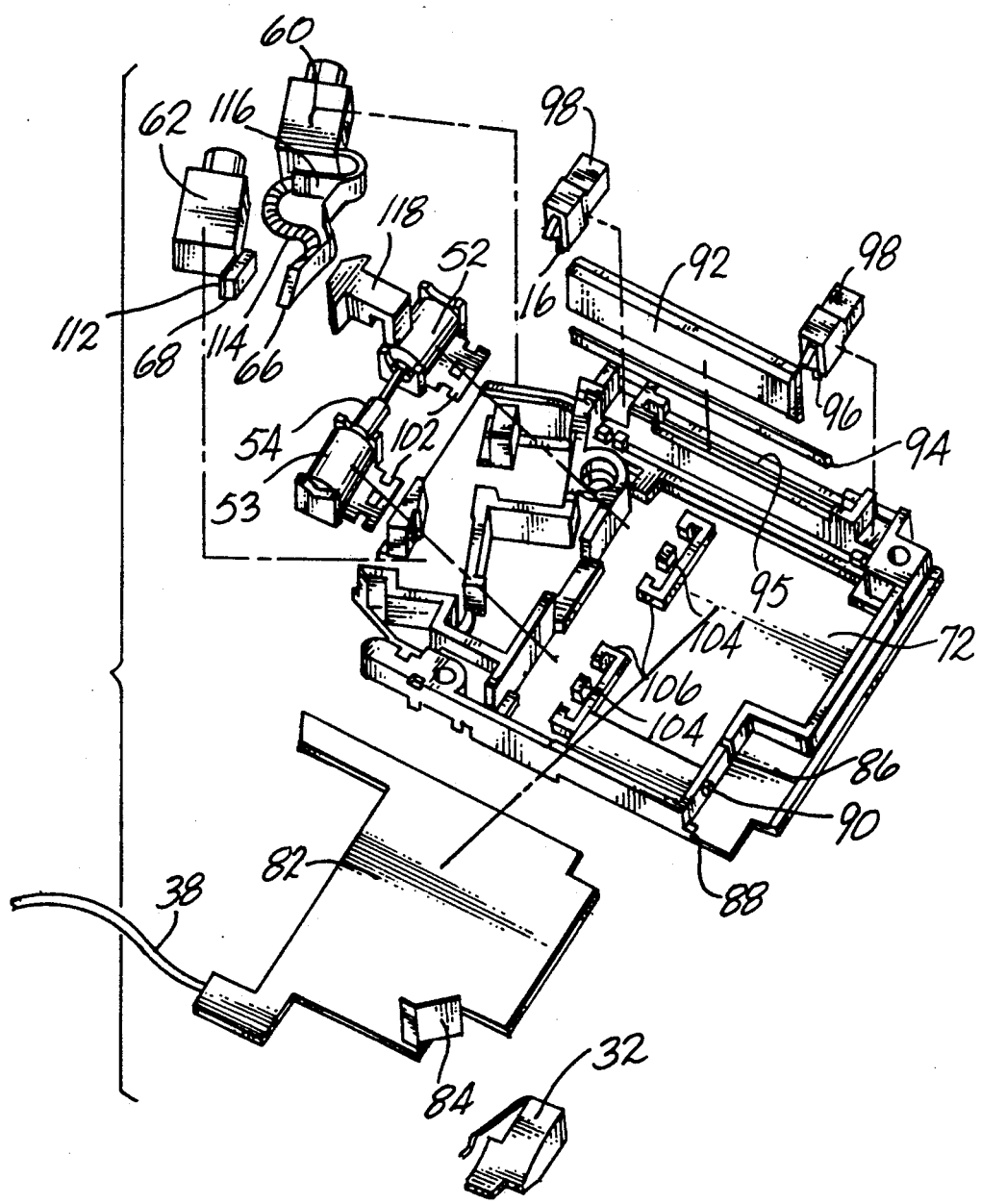
FIG. 4 is an exploded perspective view of one pole of the adaptable switch module.
Figure 5:
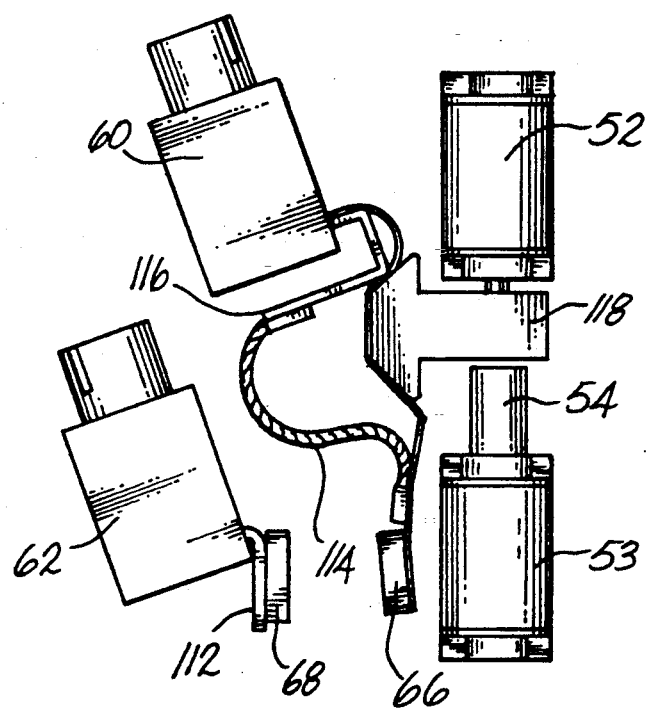
FIG. 5 is an elevation view of a single pole of the adaptable switch module showing the switching components in an open position.

Referring to FIG. 4, the output lug 62 provides interconnection to one side of the switch through a stationary arm 112 which carries the contact 68. The input lug 60 provides connection to the other side of the switch through the moving switch arm 64 and its moving contact 66. A shunt braid 114 in the form of a flexible low-resistance connection to the moving switch arm 64 together with the input lug 60 provide a shunt path for load current through a shunt clip 116. The resulting shunt path reduces power dissipation and subsequent heating of the switch arm 64.

Figure 6:
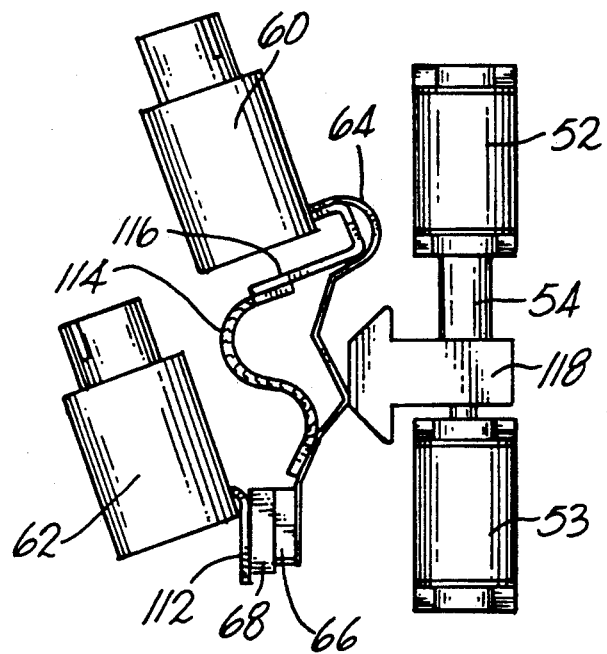
FIG. 6 is an elevation view of a single pole of the adaptable switch module showing the switching components in a closed position.

The solenoids 52 and 53 have a common armature 54 which moves an operator 118 to allow the moving switch arm, through its own resilience, to move between its open and closed positions. The operator has a cam-like surface engaging an angular surface on the complexly shaped switch arm 64. Movement of the operator into pressure contact with the angled surface on the switch arm closes the switch contacts. The switch moves to the open position shown in FIG. 5 after the solenoid 52 has been energized momentarily. The moving switch arm 64 subsequently is latched into the open position, maintaining the operator 118 and armature 54 in a position close to the solenoid 52 and away from the other solenoid 53. To close the switch as shown in FIG. 6, the solenoid 53 is energized momentarily, pulling the armature and the operator toward the solenoid 53. The moving arm 64 and moving contact 66 are now allowed to make connection with the stationary contact 68, completing the circuit through the output lug 62. In this position, the moving arm is further deflected between the operator and the stationary contact 68, resulting in a force which acts to both close the contacts and to prevent movement of the operator 118, and thus armature 54, until subsequent activation of the solenoid 52. The solenoids are only energized for less than 1/2-cycle of the power line. Electronics on the circuit board do not allow repeat activation of the same solenoid for a substantially longer time (many seconds), allowing them to be driven at a relatively high power level without overheating.

Figure 7:
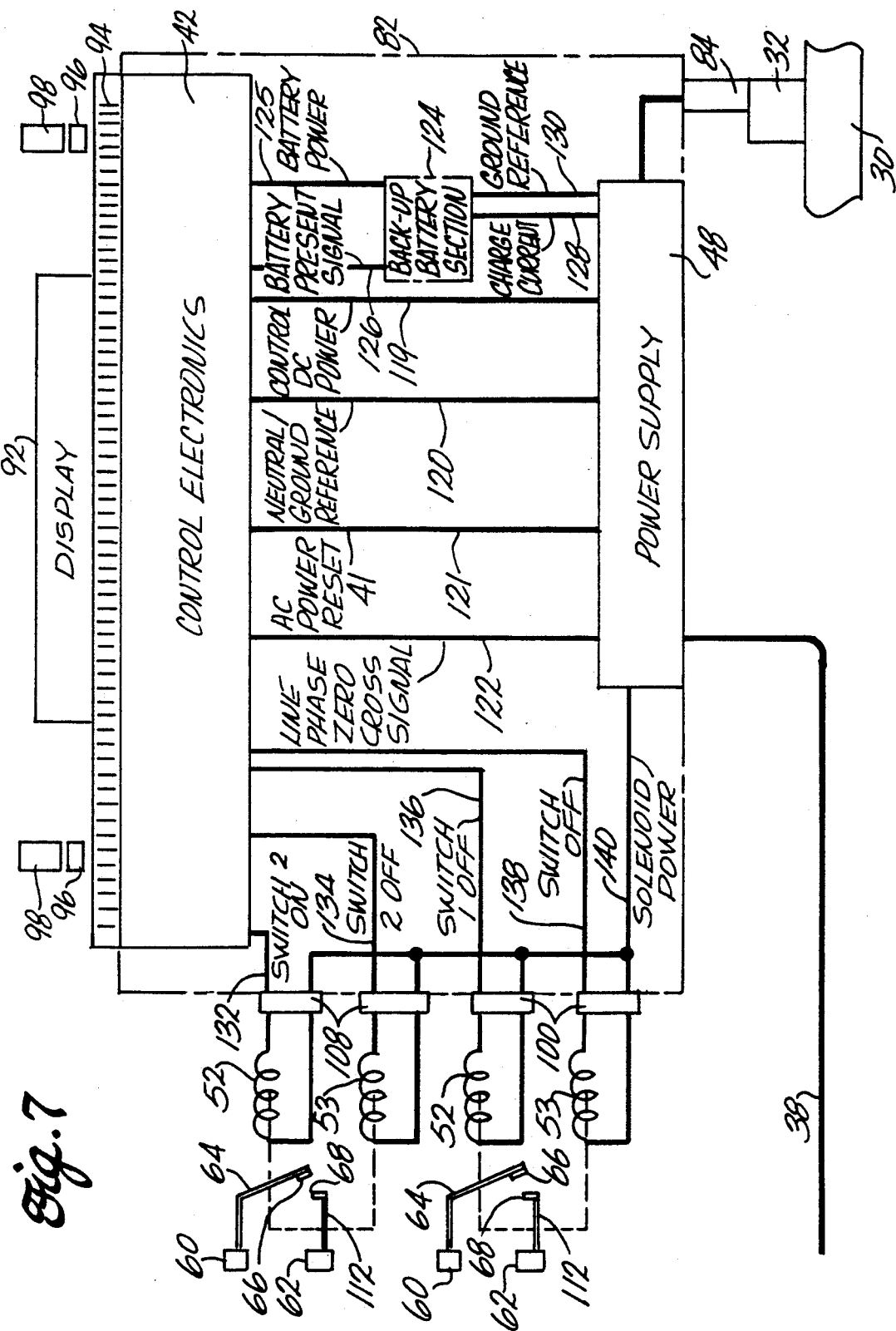
FIG. 7 is a schematic functional block diagram illustrating microprocessor controls for a two-pole switch configured as a timer.

FIG. 7 is a block diagram of the adaptable power switch module configured as a timer controlling a two-pole switch. The power supply 48 connects to the circuit breaker panel buss 30 through the power tab 84 and buss attachment 32. The circuit is completed to the power supply through the neutral wire 38 which attaches to the circuit breaker panel neutral. The power supply derives a direct current operating voltage 119 and its reference ground 120 for the control electronics 42 through well-known means. The power supply additionally supplies to the control electronics an AC power reset signal 121 which is responsive to the presence or absence of line voltage at the buss attachment. The power supply also provides a line phase zero cross signal 122 to the control electronics in response to the transition of the power line voltage from a negative voltage to a positive voltage. This line phase zero cross signal is used by the control electronics to coordinate the timing of activation signals to the solenoids 52 and 53.

An optional backup battery section 124 provides operating power on a line 125 for the control electronics 42 in the event that line power is not available at the buss attachment 32. Thus, program selections in the control electronics may be retained. Since the backup battery section is optional, a "battery present" signal 126 is sent to the control electronics. The backup battery section has a charge current 128 and ground reference 130 by the power supply when line voltage is available at the buss attachment.

While the control electronics 42 could be implemented in a variety of ways, the preferred embodiment comprises a CMOS microcomputer circuit. A wide variety of such devices are available, such as the uPD 7503 available through NEC Electronics, which incorporates means to drive the liquid crystal display 92, process serial data transmission and reception, process input and output signals, as well as providing the standard microcomputer functions of a read-only-memory, random-access-memory, count events for timing purposes, and other functions. The device used in the preferred embodiment requires a low supply voltage at currents well below one milliampere, making battery backup feasible and simplifying the requirements of the power supply. The first pole of the switch is controlled by on and off signals 132 and 134 generated by the control electronics and sent to the solenoids controlling the first switch. The second pole of the switch is controlled by separate on and off signals 136 and 138 sent to the solenoids for controlling the second switch. Solenoid power is supplied to all solenoids through a line 140 from the power supply.

Programming of the module is accomplished through use of prompts or messages displayed on the display unit 92 and responses or selections made through the push buttons 96 and their associated return spring contacts 98.

Figure 8:
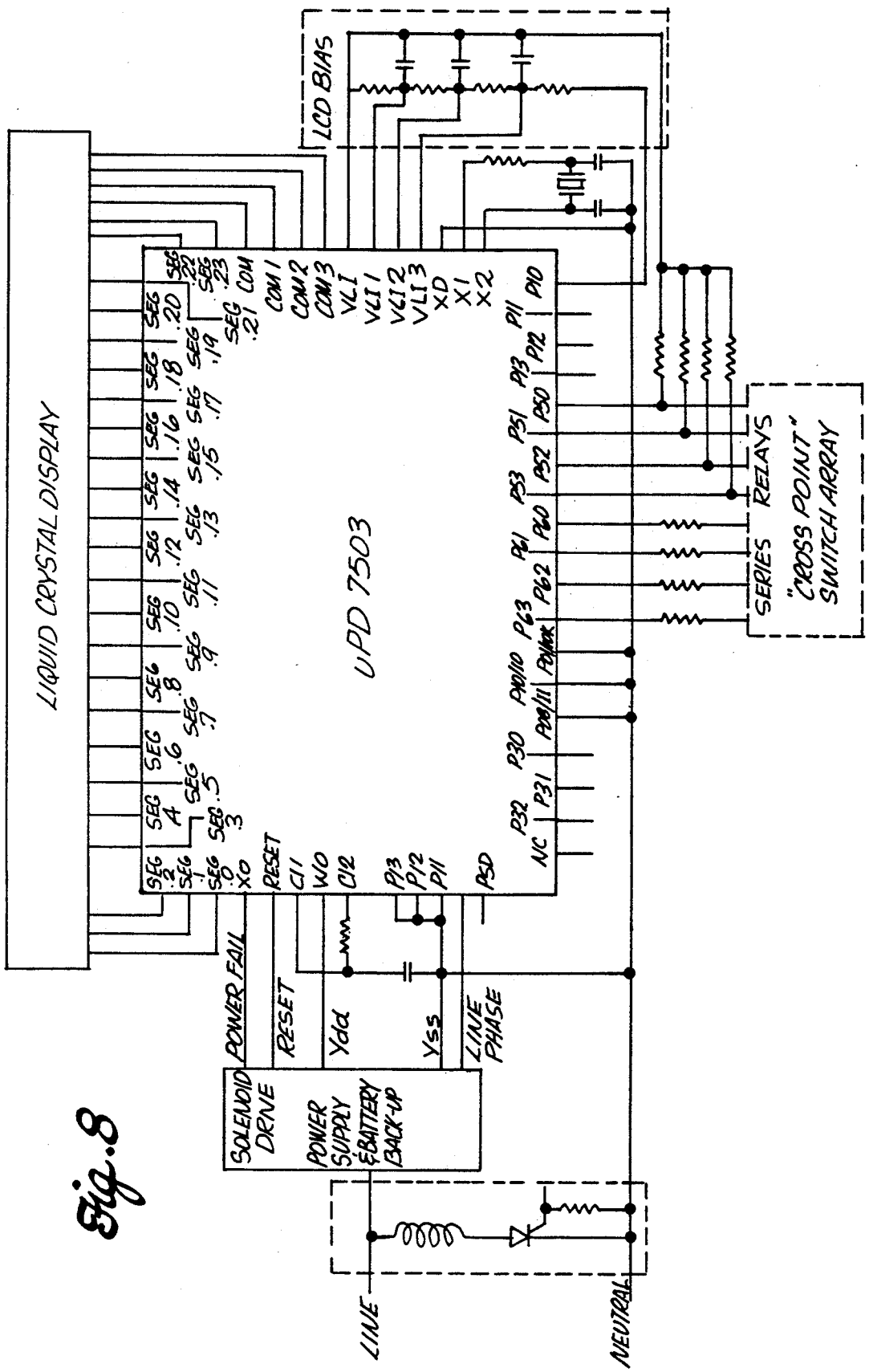
FIG. 8 is a schematic functional block diagram illustrating further microprocessor controls for a timer switch.

Referring to the block diagram of FIG. 8, an NEC uPD 7503 microcomputer is used in the preferred embodiment of the adaptive switch module when configured as a timer. This processor is used due to its integrated liquid crystal display driver, as well as its low power consumption. The 7503 is a 4-bit microcomputer with 4K of read-only-memory (ROM), 224 four-bit storage registers (RAM), an 8-bit timer counter capable of generating interrupts, and 23 input-output ports. This device also contains a Serial Interface that may be used for sending or receiving data (for instance, over the power lines).

The components used for the LCD BIAS circuit 150 provide the necessary voltages to drive a multiplexed four-backplane liquid crystal display 92. The microprocessor transparently writes data that has been stored in the lowest 24 RAM locations to the display in conjunction with the appropriate backplane voltages.

A 32,768 Hz crystal 151 (see FIG. 8) and associated components are connected to the processor so as to generate an accurate 0.5-second interrupt used to keep track of time of day.

The power supply 48 and back-up battery section 124 shown in FIG. 7 are shown as a common unit 152 in the block diagram of FIG. 8. The components in the power supply are configured to supply a Vdd (+3V) signal 154 and Vss (ground) signal 156 to the processor, while also providing a signal 158 to indicate failure of the battery backup, a reset, or power-on signal 160, and a digital signal 162 representing the phase of the power line relative to the neutral input. The power fail signal to the processor indicates that the backup battery is nearly discharged and signals the processor to enter a low power data retention mode that will preserve the data contained in RAM for a considerably longer time, using the remaining energy in the backup battery. This data retention mode is exited upon resumption of AC power as detected by a change in the line phase signal 162.

A simple RC circuit 164 is connected to inputs 166 and 168 of the processor to provide an approximately 100 Khz "clock" signal used to generate system timing for program execution.

Eight of the input-output ports are configured as strobes and returns from a "Cross-Point" or matrix switch array 170. Two of the contacts for this array are presented to the user as push buttons for navigation of the Menu and input of data for times, dates, and modes of operation. The remaining contacts of this array may be used for other purposes, such as manual or auxiliary requests for switch position changes.

Two to six of the remaining input-output ports are used to drive the gates of the SCRs 56 that power the switch control solenoids (only solenoid 52 is shown in FIG. 8). The relative timing of the SCR gate drives is determined by the processor through utilization of the line phase signal 162 provided by the power supply. Various delays after a positive going "Zero-Cross" may be computed by the processor, and the gate drives are removed before the line becomes negative. The processor also establishes a maximum repetition rate for the solenoids to prevent overheating.

Figure 9:
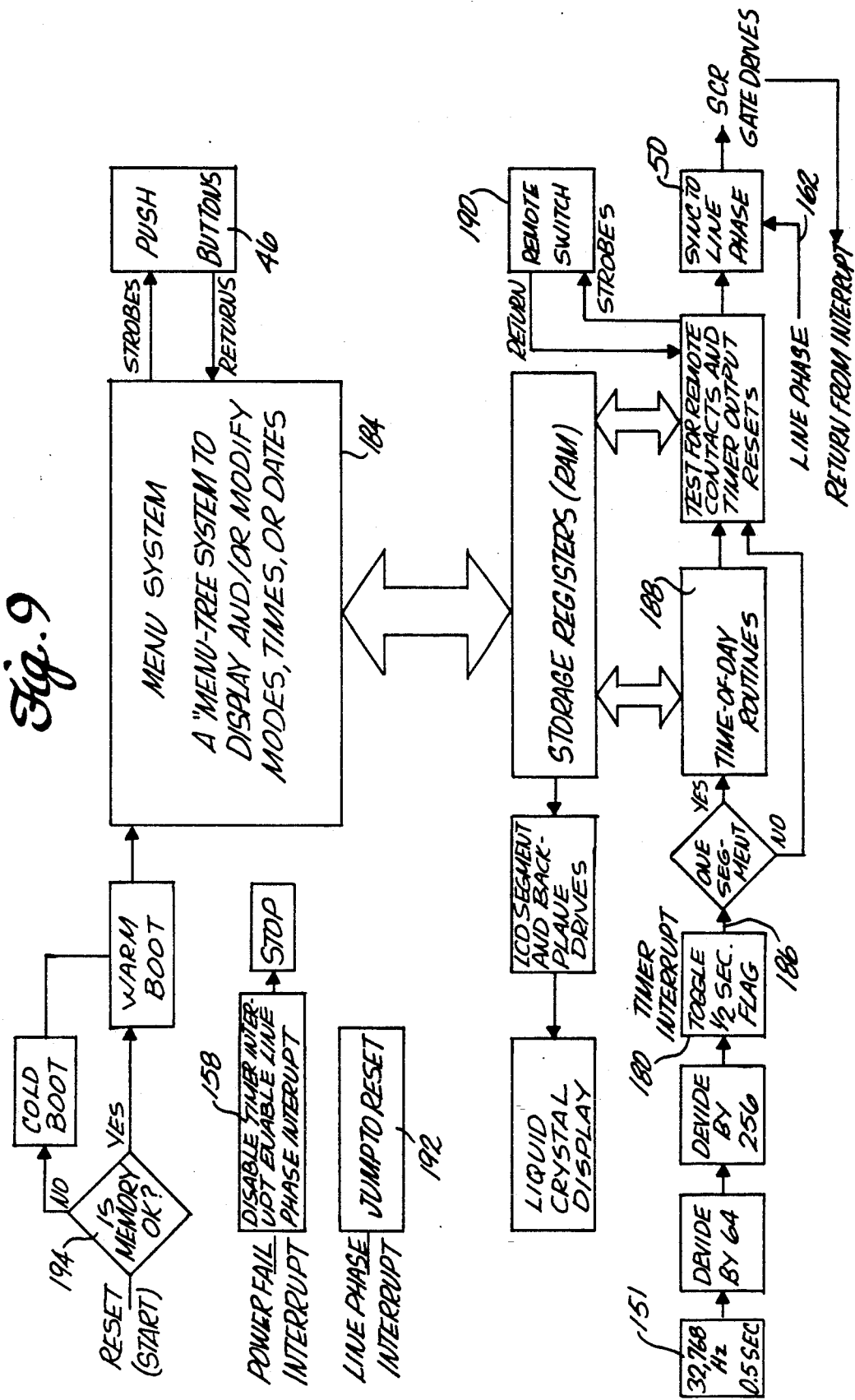
FIG. 9 is a flow chart illustrating the general scheme of operation of the processor controls shown in FIG. 8.

The flow chart of FIG. 9 describes the general operation of the processor 42. At the time power is first applied, the reset signal 160 is generated by the power supply section 152, causing the program to begin by examining a section of its memory (RAM) to determine whether or not data contained there may be "corrupt". If it is determined that the data may be corrupt, execution branches to a block of code ("cold boot") that initializes all the RAM locations. If the determination was that the memory was not corrupt, these instructions are not executed. This provides a method to retain the user "Timer Programs," "Holiday Schedules," and other selected program data in the event of an extremely long power outage.

Processing then continues in a block identified as "Warm Boot" having instructions that ask the user to input the correct date and day and subsequent instructions that allow interrupts from the TIMER 180 or POWER FAIL 158 to be processed.

Execution continues into the MENU SYSTEM 184. The MENU SYSTEM is a "Tree" system that allows navigation through the use of the two user push buttons 46. The user pushes one push button to move to the next menu selection, the other push button to move to the previous selection, or both push buttons to "select" the current option. When in a mode that requires input (such as time of day, date, etc.), one push button will increase the data, the other push button will decrease the data, and both push buttons will "enter" the data. The MENU SYSTEM 184 is a "background" program;

that is, it is always running, except when "interrupted" and is returned to when the "interrupt" is completed.

Referring to the TIMER INTERRUPT 180, the processor is provided with a crystal oscillator and an internal divider chain that provides timer interrupt signals 186 every 0.5 second. A bit in memory is toggled at each occurrence of this interrupt, and every other interrupt will branch to TIME-OF-DAY ROUTINES 188. The TIME-OF-DAY ROUTINES provide means to keep track of the current time, date, day of the week, month, and year. They also can automatically account for "Daylight Saving" time, if the user has selected this option. At the conclusion of the time updates, the program determines if any of the program selections require the switch to turn on or off at that time. The program also polls REMOTE SWITCH COMMAND lines 190 to determine if an external decision has been made requiring a switch to be turned on or off. If the switch is to be turned on, the program makes sure that the switch has not been turned on recently enough to cause overheating of the switch solenoids. The program subsequently monitors the state of the line phase signal 162 and, at the proper point in time, raises the gate drive signals 50 to the appropriate SCRs. After a time to allow the gates to latch, and before the line reverses phase, the gate drive signal is returned to ground. The TIMER INTERRUPT routine 180 is now complete, and program control is returned to the MENU SYSTEM at the exact point it was at when interrupted. This interrupt action is all completed in less than 50 milliseconds and is transparent to the user.

The POWER FAIL interrupt signal 158 is provided by the power supply to indicate to the processor that AC power is not available, and that the battery voltage is becoming too low to continue operation. This interrupt causes the processor to enter a low power data retention mode that preserves the state of internal RAM until AC power is restored. The restoration of power is detected by a LINE PHASE INTERRUPT 192, which is only enabled during the power-down mode and results in processing continuing at RESET or START 194.

Figure 10:
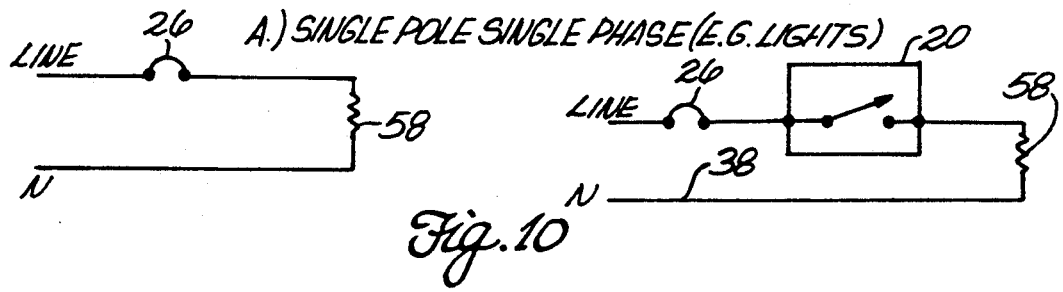
FIG. 10 through 14 illustrate examples of alternative uses of the adaptable control module compared with use of a conventional circuit and circuit breaker for each example.
Figure 11:
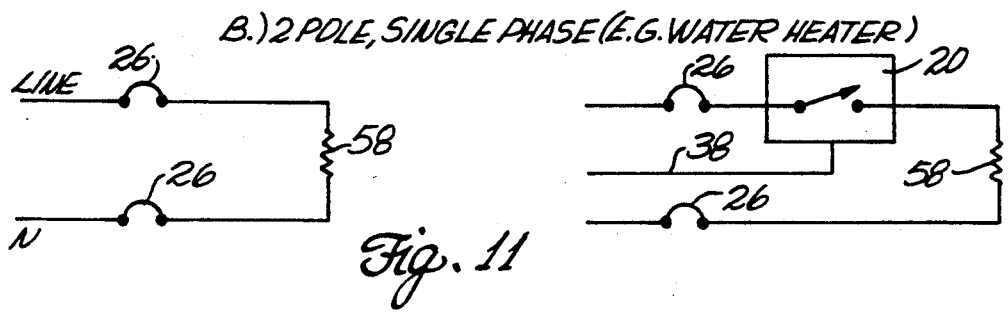
Figure 12:
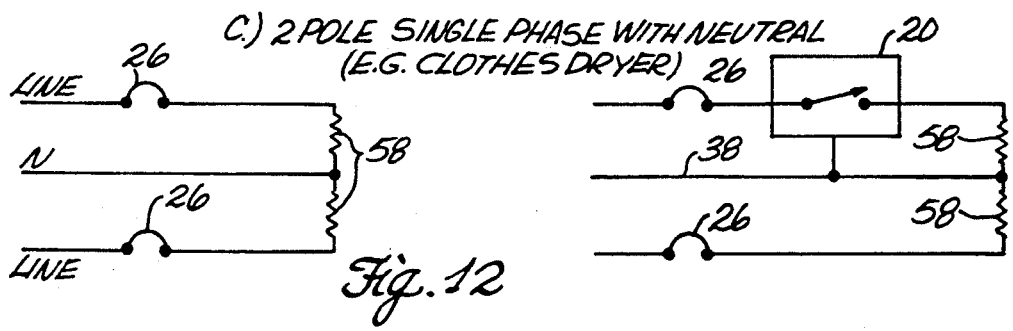
Figure 13:
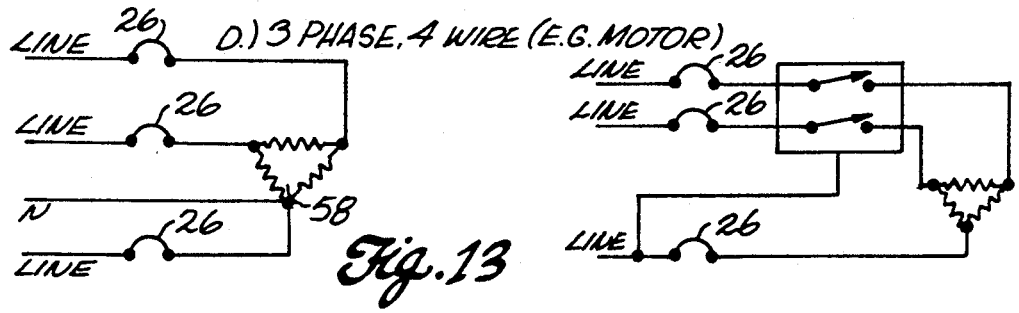
Figure 14:
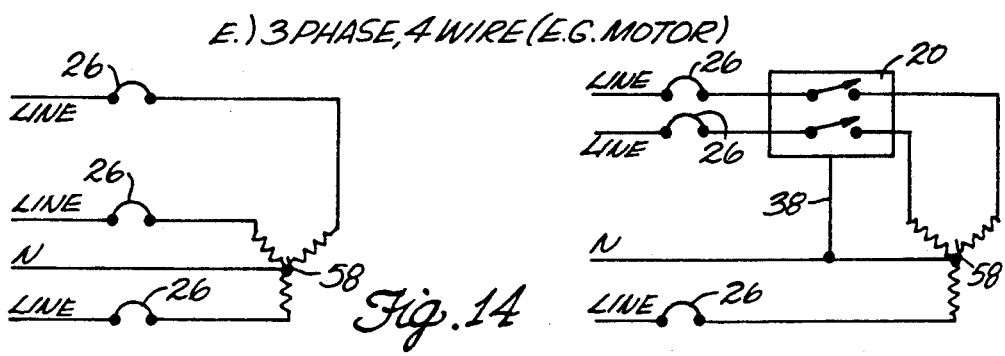

FIGS. 10 through 14 are examples of various uses of the adaptive switch module 20 of this invention. In each of the FIGS. 10 through 14, the circuit on the left side represents an existing circuit using one or more standard circuit breaker connections; the circuit on the right side of each figure represents the connection of the switching module to the circuit breaker panel for use in controlling the function of the load 58. The configuration of the adaptive switching module as a single pole switch is shown in FIGS. 10 through 12, and a double-pole configuration is shown in FIGS. 13 and 14.

What is claimed is:

1. A power switch module adapted for use in circuit breaker panels of various configurations, the circuit breaker panel having a power buss extending along a series of side-by-side circuit breaker panel positions each configured to normally receive a single conventional circuit breaker unit, the switching module having an integral electrical control function for controlling switching to an external load, the power switch module comprising a housing; switch means including a pair of switch contacts in the housing movable between an open position and a closed position; microprocessor means in the housing having a control function for controlling operation of the switch means; switch control means in the housing responsive to an output from the microprocessor for moving the switch contacts between the open and closed positions; control inputs to the microprocessor for controlling operation of the switch means; the housing having an external configuration for mounting the housing in a single breaker position in the circuit breaker panel normally occupied by a single conventional circuit breaker unit; a circuit breaker buss connector on the housing for attachment to the power buss of the circuit breaker panel; first circuit means within the housing for transmitting electrical power from the buss connector to the microprocessor for controlling microprocessor functioning; second circuit means within the housing for transmitting electrical power from the buss connector to the switch control means, the switch control means being activated by an output from the microprocessor to produce a control signal for closing the switch contacts to carry out said control function of the microprocessor; a switched circuit input to one of said switch contacts for coupling power from the power buss to the switch means through an intervening series-connected circuit breaker unit externally mounted in a separate circuit breaker position within the same panel; and a switch circuit output from the other of said switch contacts for coupling electrical power from the series-connected circuit breaker unit through the switch means and to an external load when the switch contacts are closed.

2. Apparatus according to claim in which the circuit breaker buss connector on the housing is removable from the housing and replaceable with a connector of different configuration.

3. Apparatus according to claim in which the switch control means comprise a double solenoid and single movable armature for moving to alternately activate one or the other of the solenoids for opening or closing the switch contacts.

4. Apparatus according to claim 1 in which the switch means include a spring-biased conductive metal switch arm movable between the open and closed positions, and a separate shunt braid coupled to the movable switch arm for protecting against excessive current and heat in the switch arm.

5. Apparatus according to claim in which the control function is a timer.

6. Apparatus according to claim in which the circuit breaker installed in the panel has a current rating orders of magnitude greater than the current supplied to the microprocessor to control its functioning.

7. Apparatus according to claim 1 in which the switch contacts dissipate power as heat, and in which the power lost through heat generated in the switch contacts is greatly less than the watt loss of an individual circuit breaker unit installed in the panel.

8. An electrical control system for controlling the switching of electrical power to a load, comprising:
a circuit breaker panel having a power buss extending along a series of side-by-side circuit breaker panel positions each configured to normally receive a single conventional circuit breaker unit;
a circuit breaker unit mounted in one of the single circuit breaker panel positions and connected to the power buss;
an adaptable power switch module having an integral electrical control function for controlling switching to the load, the power switch module comprising a housing; switch means including a pair of switch contacts in the housing movable between an open position and a closed position; control means in the housing for controlling operation of the switch means; switch control means in the housing responsive to an output from the control means for moving the switch contacts between the open and closed positions; the housing having an external configuration for mounting the housing in a single breaker position in the circuit breaker panel; a circuit breaker buss connector on the housing for attachment to the power buss of the circuit breaker panel; first circuit means within the housing for transmitting electrical control power from the buss connector to the control means at a power level greatly less than the rated power level of the circuit breaker panel; second circuit means within the housing for transmitting electrical control power from the buss connector to the switch control means, the switch control means being activated by an output from the control means to produce a control signal for closing the switch contacts; a switched circuit input to one of said switch contacts for coupling power from the power buss to the switch means through the series-connected circuit breaker unit externally mounted in said separate circuit breaker position in the panel; and a switch circuit output from the other of said switch contacts for coupling electrical power from the series connected circuit breaker unit through the switch means and to the external load when the switch contacts are closed.

9. The system according to claim 8 including a neutral wire connected to the switch module housing and extending to a neutral terminal on the panel.

10. The system according to claim 8 in which the circuit breaker buss connector on the housing is removable from the housing and replaceable with a connector of different configuration.

11. The system according to claim 8 in which the switch control means comprise a double solenoid and single movable armature for moving to alternately activate one or the other of the solenoids for opening or closing the switch contacts.

12. The system according to claim 8 in which the switch means include a spring-biased conductive metal switch arm movable between the open and closed positions, and a separate shunt braid coupled to the movable switch arm for protecting against excessive current and heat in the switch arm.

13. The system according to claim 8 in which the control function is a timer.

14. The system according to claim 8 in which the circuit breaker installed in the panel has a current rating orders of magnitude greater than the current supplied to the microprocessor to control its functioning.

15. The system according to claim 8 in which the switch contacts dissipate power as heat, and in which the power lost through heat generated in the switch contacts is greatly less than the watt loss of an individual circuit breaker unit installed in the panel.

* * * * *

UNITED STATES PATENT AND TRADEMARK OFFICE
CERTIFICATE OF CORRECTION

PATENT NO. : 5,289,148
DATED : February 22, 1994
INVENTOR(S) : John V. Siglock; Lawrence Phillips, Jr.

It is certified that error appears in the above-indentified patent and that said Letters Patent is hereby corrected as shown below:

```
Column 1, line 13, change "three" to -- there --.
Column 1, line 39, after "functions" insert a period.

Column 2, line 44, after "function" insert a period.

Column 10, line 28, after "claim" insert -- 1 --.
Column 10, line 32, after "claim" insert -- 1 --.
Column 10, line 43, after "claim" insert -- 1 --.
Column 10, line 45, after "claim" insert -- 1 --.
```

Signed and Sealed this

Twenty-ninth Day of August, 1995

Attest:

BRUCE LEHMAN

*Attesting Officer*     *Commissioner of Patents and Trademarks*